United States Patent

[11] 3,554,248

[72] Inventors William W. Chambers
Towson;
Jerome I. Rebold, Baltimore, Md.; Somers H. Smith III, Falls Church, Va.
[21] Appl. No. 747,983
[22] Filed July 26, 1968
[45] Patented Jan. 12, 1971
[73] Assignee The Black and Decker Manufacturing Company
Towson, Md.
a corporation of Maryland

[54] TIRE STAND
15 Claims, 6 Drawing Figs.
[52] U.S. Cl. ................................................. 144/288, 157/13; 29/212
[51] Int. Cl. ..................................................... B29h 17/00; B60c 25/00
[50] Field of Search.......................................... 144/288-1, 288; 157/WH, 13; 29/212T; 269/291, 293, 48

[56] References Cited
UNITED STATES PATENTS

| 652,441 | 6/1900 | McClellan | 269/95 |
| 1,727,032 | 9/1929 | Guignon | 143/132X |
| 1,809,169 | 6/1931 | Kennedy | 144/288 |
| 2,681,499 | 6/1954 | Collett | 157/13 |
| 3,367,015 | 2/1968 | Brosene | 29/212 |

FOREIGN PATENTS

| 132,401 | 9/1919 | Great Britain | 308/RB |

Primary Examiner—Donald R. Schran
Attorneys—Leonard Bloom and Joseph R. Slotnik

ABSTRACT: The device disclosed herein is a removable, wall-mounted stand adapted to support a tire while it is being studded. The stand is reversible to suit available space where installed and is adapted to accommodate a stud gun when not in use, studs, and an automatic stud feeder.

PATENTED JAN 12 1971

INVENTORS
WILLIAM W. CHAMBERS
JEROME I. REBOLD
SOMERS H. SMITH, III
BY Joseph R. Slotnik
ATTORNEY

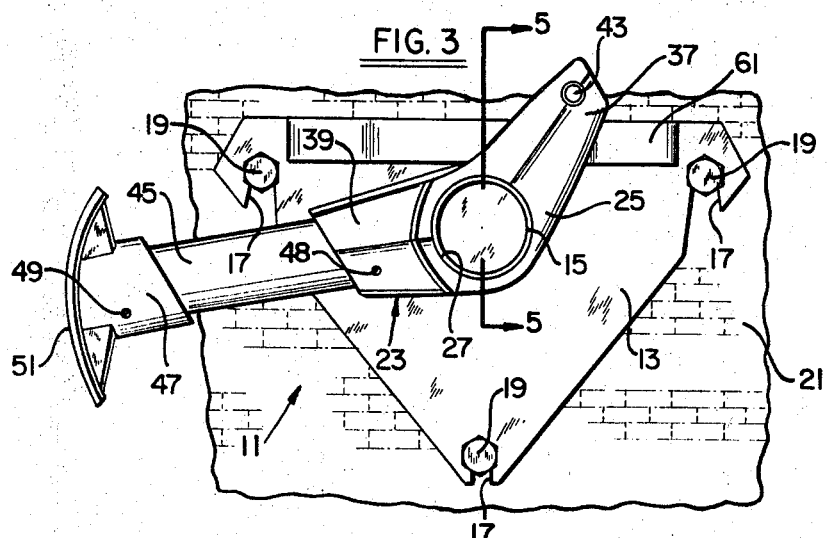
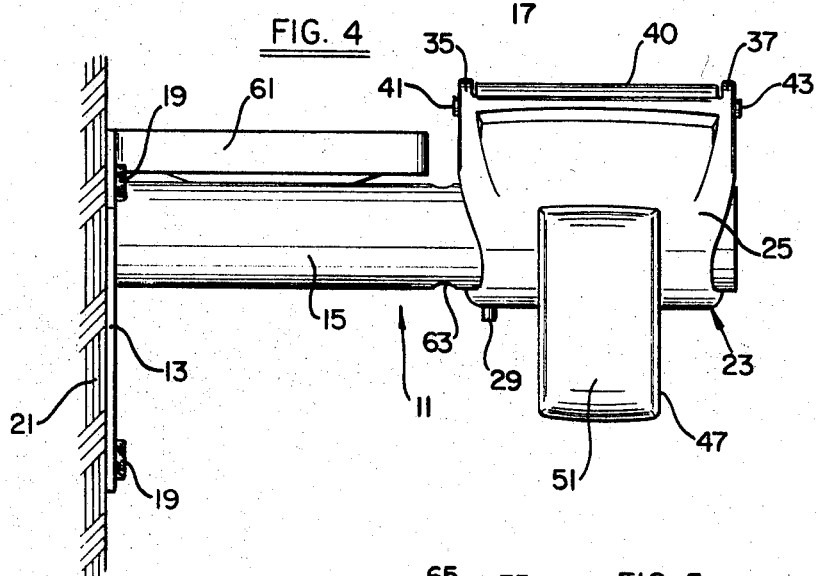
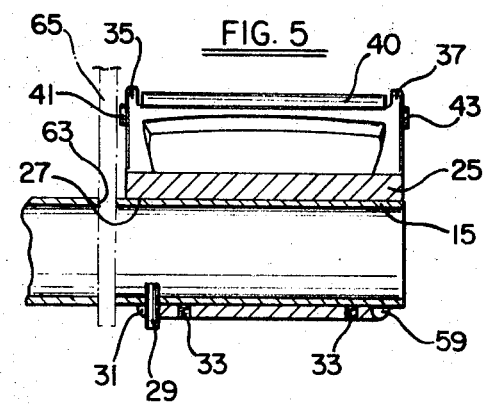
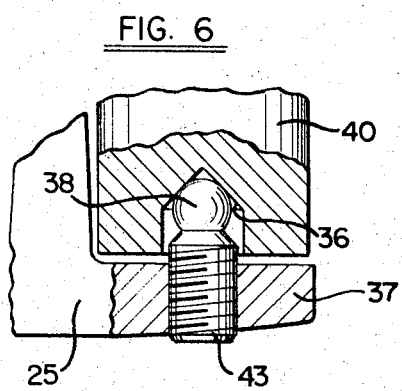
INVENTORS
WILLIAM W. CHAMBERS
JEROME I. REBOLD
SOMERS H. SMITH, III
BY Joseph R. Slotnik
ATTORNEY

TIRE STAND

SUMMARY OF THE INVENTION

The present invention relates to a wall mounted, tire studding stand which may be removably mounted in a variety of locations as best suits the space available. The stand sturdily supports all popular sized tires and accommodates easy reversing to further suit available space in installation. The stand includes a minimum of parts, for both space and cost reasons, and yet is sturdy, reliable and easy to use. In addition, the stand may include a traylike member, for placement of a studding gun and studs, and easily accommodates and is adapted to support an automatic stud feeder.

Main objects of the present invention, therefore, are to provide an improved tire stand for supporting a tire while being studded which stand is readily mounted in a variety of locations, occupies a minimum of space and is readily removable for storage when not in use.

Further important objects of the invention are to provide an improved tire studding stand of the above character which accommodates and sturdily supports all popular tire sizes and is reversible to further accommodate space requirements.

Additional important objects are to provide an improved tire studding stand of the above character which may include provisions for supporting a stud gun, studs and/or an automatic stud feeder, and which is relatively inexpensive to manufacture, rugged in construction and reliable in use.

Other objects and advantages of the invention will become more apparent from a consideration of the detailed description to follow taken in conjunction with the drawings annexed hereto.

BRIEF DESCRIPTION OF THE DRAWINGS

FIG. 3 is an end view of FIG. 2 looking in the direction of the arrows 3—3;

FIG. 4 is a side view of FIG. 3;

FIG. 5 is a sectional view of FIG. 3 taken along the line 5—5 thereof; and

FIG. 6 is an enlarged view of a portion of FIG. 2.

BROAD STATEMENT OF THE INVENTION

Figure 1:
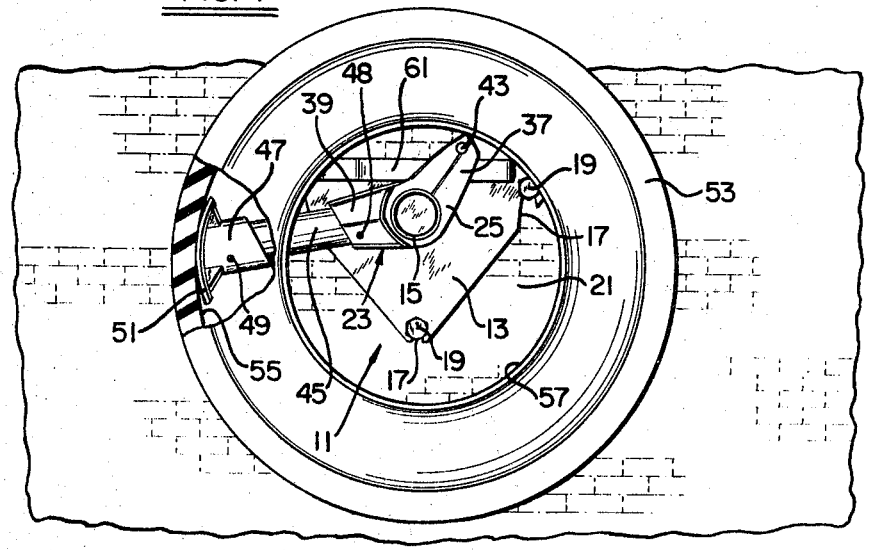
FIG. 1 is an elevational view illustrating a tire studding stand embodying the present invention and shown with a tire in place thereon and partly broken away and in section for clarity.

Broadly described, the present invention relates to a tire stand comprising bracket means adapted to be fixed to a wall and the like, said bracket means including a portion spaced from said wall, support means on said bracket means and including shoe means and roller means adapted to engage the inner tread wall and tire beads, respectively, of a tire at arcuately spaced locations to support said tire substantially in a vertical plane during studding, said shoe means comprising a member defining a fixed convex surface said shoe means and said roller means being disposed on opposite sides of a vertical plane passing through the central axis of said tire.

In another aspect, the present invention relates to a tire stand comprising bracket means adapted to be removably fixed to a wall and the like and including a portion extending away from said wall, support means adapted to support a tire in substantially a vertical plane during studding, said support means including anvil means comprising a member defining a fixed convex surface engageable with the inner tread wall of said tire and disposed in spaced relation to a vertical plane which includes the central axis of said tire, and means reversibly interconnecting said support means and said extending portion of said bracket means, whereby said anvil means may be positioned to either side of said vertical plane.

In still another aspect, the present invention relates to a tire stand comprising bracket means removably fixed to a wall, support means reversibly secured to said bracket means and adapted to rotatably support a tire substantially in a vertical plane, said support means including anvil means comprising a member defining a fixed convex surface engageable with the inner tread wall of said tire, at a position spaced from a vertical plane which includes said central axis of said tire, whereby said anvil means may be positioned to either side of said vertical plane.

DETAILED DESCRIPTION

Referring now more specifically to the drawings, a tire stand embodying the present invention is illustrated generally at 11 and is seen to include a bracket made up of a plate 13 and arm 15 welded together or otherwise rigidly interconnected. The plate 13 has a plurality of notches 17 therein adapted to fit over headed fasteners 19 which in turn are secured to a wall 21.

The arm 15 extends outwardly from the wall 21 and, although not critical, is seen to be substantially cylindrical in cross section, being adapted to have a tire support 23 fitted thereon. The support includes a body 25 having a through aperture 27 adapted to slidably fit over the cylindrical arm 15. A pin 29 fixed to the arm 15 is adapted to fit into a notch 31 in the body 25 to locate the latter angularly on the arm, while set screws 33 removably hold the body 25 in place on the arm 15.

The support body 25 has a pair of parallel, spaced flanges 35, 37 at one end and a hollow hub 39 at the other end thereof. A cylindrical roller 40 is positioned between the flanges 35, 37 and is rotatably supported by set screws 41, 43 threaded through the flanges 35, 37, respectively, and each of which holds a bearing ball 38 in place in a conical recess 36 at each end of the roller 40. By this construction, the roller 40 is easily and accurately centered and turns without play. The hollow hub 39 is adapted to receive one end of a post 45 which has a shoe 47 on its other end. Set screws 48, 49 fix the post 45 to the hub 39 and the shoe 47 to the post, respectively. The shoe 47 has a convexly curved plate 51 suitably fixed thereto or integral therewith.

As shown in FIG. 1, a tire 53 to be studded is adapted to be mounted on the support 23 and supported in a generally vertical plane. In position, the tire 53 has its inner tread wall 55 seated against the shoe plate 51 while the cylindrical roller 40 engages both of the tire beads 57. Desirably, the roller 40 and the shoe plate 51 engage the tire 53 substantially on opposite sides of a vertical plane through the central axis of the tire. In the construction shown, the shoe plate 51 provides a conveniently positioned anvillike backing for the portion of the tire being studded.

In use, the tire 53 to be studded is fitted over the shoe 47 and then swung over the roller 40. The operator then begins studding the tire 53 in the tread area adjacent the shoe plate 51 and, as studding progresses, the tire 53 is rotated by lifting it near the shoe 47 and causing it to roll on the roller 40. This particular support construction 23 provides sturdy support for the tire 53 during studding because of its engagement with the tire 53 at spaced arcuate locations and because of the wide roller 40 which engages both beads 57. Furthermore, the support 23 facilitates easy, one-handed rotation of the tire 53 during studding while the shoe plate 51 provides a convenient anvil for standup operation. In addition, the support 23 accommodates all popular tire sizes without adjustment since it functions within a large range of tire diameter or width.

It will be appreciated that different installation locations present different space problems. Thus, in some locations, the arrangement shown in the drawings may be the most desirable while in others, it may be desirable to have the shoe 47 to the other side of the arm 15 (to the right as seen in FIG. 1). In addition, although the arm 15 may obviously be long enough to accommodate both right-handed and left-handed operators, personal preference may dictate otherwise.

To this end, the support body 25 is reversibly mounted on the arm 15. Thus, where it is desirable to have the shoe 47 on the other (right) side of the arm 15, the set screws 33 are loosened, the body 25 removed from the arm 15, and reversed end-for-end and remounted on the arm 15, and the set screws 33 retightened. The body 25 has another notch 59, opposite the notch 31, which receives the pin 29 in this "reversed" position.

In addition to the advantages set out hereinabove, it will be appreciated that when not in use, such as during the warmer seasons, the tire stand 11 may be removed simply by loosening the fasteners 19 and lifting the entire assembly off the wall 21. The fasteners 19 may, of course, be left in place if desired.

It has been found that minimal floor space is required for accommodating this stand 11 and for using it during tire studding. Thus, for example, in most installations the area behind the garage door opening has been found adequate.

Figure 2:
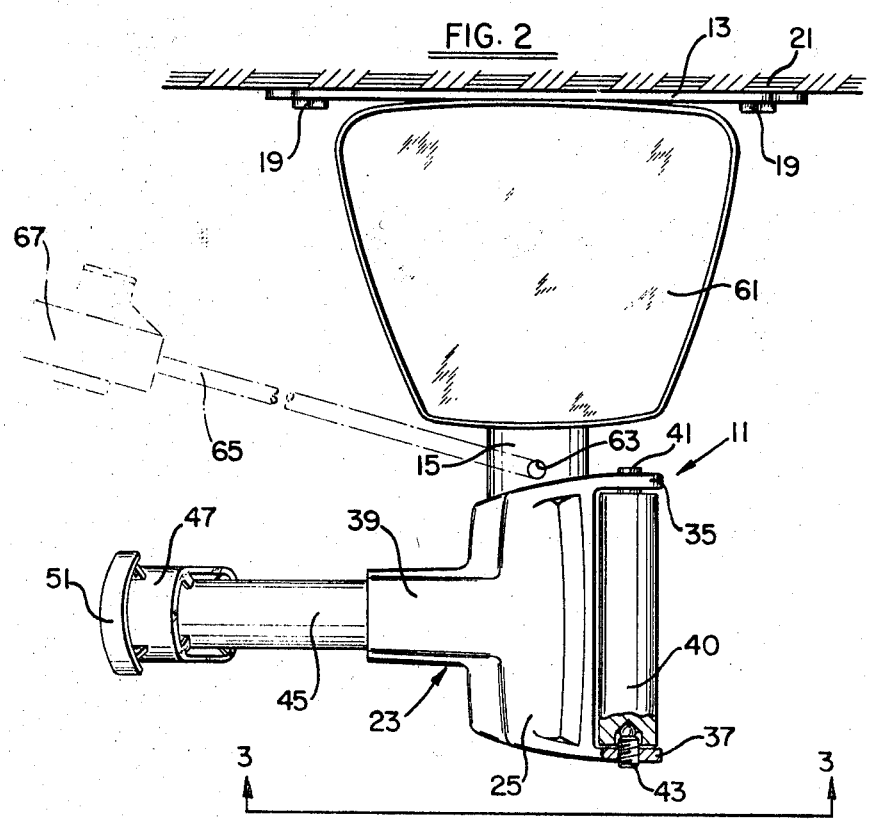
FIG. 2 is a top plan view of FIG. 1 to an enlarged scale and with the tire removed.

As an additional feature, a tray 61 may be provided over the arm 15 between the plate 13 and the body 21. This tray 61 may be secured to the place 13, the arm 15, or both, as by welding, and provides a convenient resting or storing place for a stud gun when not in use, and for the studs themselves. Also, the arm 15 may be apertured, as at 63, to receive a supporting post 65 for an automatic stud feeder 67 shown in dot-dash lines in FIGS. 2 and 5.

By the foregoing, there has been disclosed an improved tire studding stand calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:

1. A tire stand comprising bracket means adapted to be fixed to a wall and the like, said bracket means including a portion spaced from said wall, support means on said bracket means and including shoe means and roller means adapted to engage the inner tread wall and tire beads, respectively, of a tire at arcuately spaced locations to support said tire substantially in a vertical plane during studding, said shoe means comprising a member defining a fixed convex surface, said shoe means and said roller means being disposed on opposite sides of a vertical plane passing through the central axis of said tire.

2. A tire stand comprising bracket means adapted to be removably fixed to a wall and the like and including a portion extending away from said wall, support means adapted to support a tire in substantially a vertical plane during studding, said support means including shoe means comprising a member defining a fixed convex surface engageable with the inner tread wall of the tire, said support means further including roller means engageable with said tire at an area arcuately spaced from said shoe member.

3. A tire stand comprising bracket means removably fixed to a wall, support means reversibly secured to said bracket means and adapted to rotatably support a tire substantially in a vertical plane, said support means including anvil means comprising a member defining a fixed convex surface engageable with the inner tread wall of said tire at a position spaced to one side of a vertical plane which includes said central axis of said tire, said support means including means engageable with said tire at a position space to the other side of said vertical plane.

4. A stand as defined in claim 1 which includes means reversibly interconnecting said support means and said bracket portion, whereby said support may be secured to said bracket portion in substantially reversed positions.

5. A stand as defined in claim 1, wherein said roller means includes an elongated roller rotatably mounted on said support means and adapted to span the width of said tire.

6. A stand as defined in claim 5, wherein said support means includes a body having projecting flanges, said roller being disposed between said flanges and having generally conical recesses at opposite ends thereof, a bearing ball located in each said recess, and means threaded through each said flange and adapted to hold each said ball in place in its respective roller recess.

7. A stand as defined in claim 1, wherein bracket means includes a plate adapted to be fixed to said wall and an arm rigid with said plate and extending away from said wall.

8. A stand as defined in claim 7, wherein said plate has slots therein adapted to fit over headed fasteners secured to said wall.

9. A stand as defined in claim 4, wherein said support means includes a body slidable on said bracket portion, said body having means on opposite sides thereof cooperable with means on said bracket portion to locate said body in reversed positions on said bracket portion.

10. A stand as defined in claim 9, wherein said means on said body includes a pair of notches, said bracket portion having a projecting member receivable in one of said notches for each of said positions of said body.

11. A stand as defined in claim 2, wherein said roller means includes a roller adapted to span the width of said tire and engageable across the beads thereof, said roller and said shoe means engaging said tire at positions located on opposite sides of a vertical plane which includes the central axis of said tire.

12. A stand as defined in claim 2, wherein said bracket means includes a plate and a hollow tube, said support means being removably secured to said tube.

13. A stand as defined in claim 2, wherein said extending portion and said support means include cooperable means adapted to lock said support means thereon in end-for-end reversed positions.

14. A stand as defined in claim 3, wherein said support means includes roller means engageable with an spanning the beads of said tire, said roller means engaging said tire at a position spaced a substantial angle from the position of engagement of said anvil means and said tire.

15. A stand as defined in claim 7 which includes tray means rigid with said arm.